United States Patent
Renkis

(10) Patent No.: US 11,128,838 B2
(45) Date of Patent: *Sep. 21, 2021

(54) SYSTEMS AND METHODS FOR AUTOMATED CLOUD-BASED ANALYTICS FOR SECURITY AND/OR SURVEILLANCE

(71) Applicant: Sensormatic Electronics, LLC, Westford, MA (US)

(72) Inventor: Martin A. Renkis, Nashville, TN (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,071

(22) Filed: Feb. 5, 2020

(65) Prior Publication Data

US 2020/0244927 A1 Jul. 30, 2020

Related U.S. Application Data

(63) Continuation of application No. 15/999,403, filed on Aug. 20, 2018, now Pat. No. 10,594,985, which is a
(Continued)

(51) Int. Cl.
*H04N 7/18* (2006.01)
*H04L 29/08* (2006.01)
(Continued)

(52) U.S. Cl.
CPC .......... *H04N 7/181* (2013.01); *B25J 9/1679* (2013.01); *G05D 1/021* (2013.01); *G06K 9/00771* (2013.01); *G06K 9/00979* (2013.01); *G06T 19/003* (2013.01); *G08B 13/00* (2013.01); *G08B 13/19656* (2013.01); *H04L 67/02* (2013.01);
(Continued)

(58) Field of Classification Search
CPC .............. H04N 7/181; H04N 21/4223; H04N 21/2187; H04N 21/41407; H04N 21/4227; H04N 21/21805; H04N 21/4728; G08B 13/19608; G08B 13/19643; G08B 13/19656; G08B 13/19663; G08B 25/08;
(Continued)

(56) References Cited

U.S. PATENT DOCUMENTS 6,842,674 B2 1/2005 Solomon
7,295,778 B2 8/2007 Arpa et al.
(Continued)

FOREIGN PATENT DOCUMENTS

KR 2013011807 10/2013

OTHER PUBLICATIONS

International Search Report and Written Opinion of International Application No. PCT/US2015/024808; dated Jul. 16, 2015, 12 pages.
(Continued)

*Primary Examiner* — Nathnael Aynalem
(74) *Attorney, Agent, or Firm* — Arent Fox LLP

(57) ABSTRACT

Systems and methods for virtualized computing or cloud-computing network with distributed input devices and at least one remote server computer for automatically analyzing received video, audio and/or image inputs for providing social security and/or surveillance for a surveillance environment, surveillance event, and/or surveillance target.

16 Claims, 5 Drawing Sheets

Related U.S. Application Data continuation of application No. 14/249,687, filed on Apr. 10, 2014, now Pat. No. 10,057,546.

(51) Int. Cl.

| | | |
|---|---|---|
| *H04N 13/275* | (2018.01) | |
| *G05D 1/02* | (2020.01) | |
| *G06K 9/00* | (2006.01) | |
| *G08B 13/196* | (2006.01) | |
| *B25J 9/16* | (2006.01) | |
| *G08B 13/00* | (2006.01) | |
| *G06T 19/00* | (2011.01) | |
| *H04N 13/239* | (2018.01) | |

(52) U.S. Cl.
CPC .......... *H04L 67/10* (2013.01); *H04L 67/1097* (2013.01); *H04L 67/125* (2013.01); *H04L 67/22* (2013.01); *H04L 67/306* (2013.01); *H04L 67/34* (2013.01); *H04N 7/18* (2013.01); *H04N 13/239* (2018.05); *H04N 13/275* (2018.05); *G05D 2201/0209* (2013.01); *H04L 67/12* (2013.01); *Y10S 901/01* (2013.01); *Y10S 901/47* (2013.01); *Y10S 901/50* (2013.01)

(58) Field of Classification Search
CPC . G08B 25/10; B60R 2325/205; B60R 25/102; B60R 25/305; H04W 12/06
USPC ................ 348/143, 154, 155, 159; 382/103; 340/506; 725/109
See application file for complete search history.

(56) References Cited

U.S. PATENT DOCUMENTS

| | | | |
|---|---|---|---|
| 7,379,879 | B1 | 5/2008 | Sloo |
| 7,675,520 | B2 | 3/2010 | Gee et al. |
| 7,944,454 | B2 | 5/2011 | Zhou et al. |
| 8,233,660 | B2 | 7/2012 | Fritsch et al. |
| 8,284,254 | B2 | 10/2012 | Romanowich et al. |
| 8,311,983 | B2 | 11/2012 | Guzik |
| 8,395,664 | B2 | 3/2013 | Renkis |
| 8,532,820 | B1 | 9/2013 | Sampath |
| 8,559,914 | B2 | 10/2013 | Jones |
| 8,584,209 | B1 | 11/2013 | Borapura et al. |
| 8,639,644 | B1 | 1/2014 | Hickman et al. |
| 8,718,837 | B2 | 5/2014 | Wang et al. |
| 8,721,197 | B2 | 5/2014 | Miyahara et al. |
| 8,745,086 | B2 | 6/2014 | Cardno et al. |
| 8,751,043 | B2 | 6/2014 | Guo et al. |
| 8,811,697 | B2 | 8/2014 | Sofka et al. |
| 8,903,551 | B2 | 12/2014 | El-Essawy et al. |
| 9,011,607 | B2 | 4/2015 | DeLuca et al. |
| 9,058,706 | B2 | 6/2015 | Cheng |
| 9,061,561 | B1 | 6/2015 | Kikuchi et al. |
| 9,216,509 | B2 | 12/2015 | Renkis |
| 9,405,979 | B2 | 8/2016 | Renkis |
| 9,407,879 | B2 | 8/2016 | Renkis |
| 9,407,880 | B2 | 8/2016 | Renkis |
| 9,407,881 | B2 | 8/2016 | Renkis |
| 9,420,238 | B2 | 8/2016 | Renkis |
| 9,426,428 | B2 | 8/2016 | Renkis |
| 9,438,865 | B2 | 9/2016 | Renkis |
| 9,514,370 | B1 | 12/2016 | Renkis |
| 9,514,371 | B1 | 12/2016 | Renkis |
| 9,516,278 | B1 | 12/2016 | Renkis |
| 9,516,279 | B1 | 12/2016 | Renkis |
| 9,516,280 | B1 | 12/2016 | Renkis |
| 9,516,281 | B1 | 12/2016 | Renkis |
| 9,686,514 | B2 | 6/2017 | Renkis |
| 9,747,502 | B2 | 8/2017 | Renkis |
| 10,057,546 | B2 | 8/2018 | Renkis |
| 10,217,003 | B2 | 2/2019 | Renkis |
| 2004/0030571 | A1 | 2/2004 | Solomon |
| 2004/0143602 | A1 | 7/2004 | Ruiz et al. |
| 2005/0055330 | A1 | 3/2005 | Britton et al. |
| 2006/0037081 | A1 | 2/2006 | Moses et al. |
| 2006/0055791 | A1 | 3/2006 | Morino |
| 2006/0066720 | A1 | 3/2006 | Renkins |
| 2006/0187305 | A1 | 8/2006 | Trivedi et al. |
| 2007/0064109 | A1 | 3/2007 | Renkins |
| 2007/0152807 | A1 | 7/2007 | Huang et al. |
| 2007/0159323 | A1 | 7/2007 | Rockefeller et al. |
| 2008/0250462 | A1 | 10/2008 | Crohas |
| 2008/0297347 | A1* | 12/2008 | Clark .................. G08B 13/2402 340/572.1 |
| 2009/0087161 | A1 | 4/2009 | Roberts et al. |
| 2010/0090841 | A1 | 4/2010 | Zhang et al. |
| 2010/0274816 | A1 | 10/2010 | Guzik |
| 2011/0018998 | A1 | 1/2011 | Guzik |
| 2011/0034209 | A1 | 2/2011 | Rubinsky et al. |
| 2011/0090334 | A1 | 4/2011 | Hicks et al. |
| 2011/0187703 | A1 | 8/2011 | Patwardhan et al. |
| 2011/0256886 | A1 | 10/2011 | Velusamy |
| 2011/0273567 | A1 | 11/2011 | Bhan |
| 2011/0288684 | A1 | 11/2011 | Farlow et al. |
| 2011/0316697 | A1 | 12/2011 | Krahnstoever et al. |
| 2012/0054841 | A1 | 3/2012 | Schultz et al. |
| 2012/0113121 | A1 | 5/2012 | Luo et al. |
| 2012/0114296 | A1 | 5/2012 | Luo et al. |
| 2012/0146789 | A1 | 6/2012 | DeLuca et al. |
| 2012/0163657 | A1 | 6/2012 | Shellshear |
| 2012/0262576 | A1* | 10/2012 | Sechrist ................ H04N 7/181 348/143 |
| 2012/0282884 | A1 | 11/2012 | Sun |
| 2012/0310836 | A1 | 12/2012 | Eden et al. |
| 2013/0021640 | A1 | 1/2013 | Tamura |
| 2013/0027552 | A1 | 1/2013 | Guzik |
| 2013/0030875 | A1 | 1/2013 | Lee et al. |
| 2013/0039542 | A1 | 2/2013 | Guzik |
| 2013/0063489 | A1 | 3/2013 | Hourie et al. |
| 2013/0242107 | A1 | 3/2013 | Huang et al. |
| 2013/0085625 | A1 | 4/2013 | Wolfe et al. |
| 2013/0102283 | A1 | 4/2013 | Lau et al. |
| 2013/0141543 | A1 | 6/2013 | Choi et al. |
| 2013/0166621 | A1 | 6/2013 | Zhu |
| 2013/0166711 | A1 | 6/2013 | Wang et al. |
| 2013/0188031 | A1 | 7/2013 | Park et al. |
| 2013/0197718 | A1 | 8/2013 | Lee et al. |
| 2013/0226655 | A1 | 8/2013 | Shaw |
| 2013/0289858 | A1 | 10/2013 | Mangiat et al. |
| 2013/0290234 | A1 | 10/2013 | Harris et al. |
| 2013/0293344 | A1 | 11/2013 | Ur |
| 2013/0338525 | A1 | 12/2013 | Allen |
| 2014/0020061 | A1 | 1/2014 | Popp et al. |
| 2014/0085501 | A1 | 3/2014 | Tran |
| 2014/0122702 | A1 | 5/2014 | Jung et al. |
| 2014/0122720 | A1 | 5/2014 | Jung et al. |
| 2014/0123028 | A1 | 5/2014 | Kamity |
| 2014/0123325 | A1 | 5/2014 | Jung et al. |
| 2014/0168453 | A1 | 6/2014 | Shoemake et al. |
| 2014/0192159 | A1 | 7/2014 | Chen et al. |
| 2014/0258444 | A1 | 9/2014 | Joe et al. |
| 2014/0266669 | A1 | 9/2014 | Fadell et al. |
| 2014/0307076 | A1 | 10/2014 | Deutsch |
| 2014/0310186 | A1 | 10/2014 | Ricci |
| 2014/0333615 | A1 | 11/2014 | Ramalingam et al. |
| 2014/0340510 | A1 | 11/2014 | Ihlenburg et al. |
| 2014/0342331 | A1 | 11/2014 | Freeman |
| 2014/0365273 | A1 | 12/2014 | Hurewitz |
| 2015/0022664 | A1 | 1/2015 | Pflug et al. |
| 2015/0022666 | A1 | 1/2015 | Kay et al. |
| 2015/0058447 | A1 | 5/2015 | Ablisu |
| 2015/0123973 | A1 | 5/2015 | Larsen |
| 2015/0127191 | A1 | 5/2015 | Misra et al. |
| 2015/0149392 | A1 | 5/2015 | Bolich |
| 2015/0163206 | A1 | 6/2015 | McCarthy et al. |
| 2015/0215583 | A1 | 7/2015 | Chang |
| 2015/0221193 | A1 | 8/2015 | Pragada |
| 2015/0248503 | A1 | 9/2015 | Glunz et al. |
| 2015/0296186 | A1 | 10/2015 | Renkis |
| 2015/0298315 | A1 | 10/2015 | Shick et al. |
| 2015/0364021 | A1 | 12/2015 | Ur |

(56) References Cited

U.S. PATENT DOCUMENTS

| | | |
|---|---|---|
| 2015/0381417 A1 | 12/2015 | Renkis |
| 2015/0381536 A1 | 12/2015 | Ptitsyn |
| 2015/0381949 A1 | 12/2015 | Renkis |
| 2016/0119607 A1 | 4/2016 | Konno |
| 2016/0357762 A1 | 12/2016 | Aghdasi et al. |
| 2017/0201725 A1 | 7/2017 | Siminoff et al. |

OTHER PUBLICATIONS

Extended European Search Report for European Application No. 15777105.6; dated Mar. 7, 2017; 7 pages.

* cited by examiner

SYSTEMS AND METHODS FOR AUTOMATED CLOUD-BASED ANALYTICS FOR SECURITY AND/OR SURVEILLANCE

CROSS-REFERENCE TO RELATED APPLICATIONS

This application is a continuation of U.S. patent application Ser. No. 15/999,403 filed on Aug. 20, 2018, which is a continuation of U.S. patent application Ser. No. 14/249,687 (now U.S. Pat. No. 10,057,546) filed on Apr. 10, 2014, both of which applications are incorporated by reference in their entireties.

TECHNICAL FIELD

The present invention relates to cloud-based systems and methods for automated analytics of inputs from remote, distributed devices for security surveillance.

BACKGROUND

It is known in the prior art to use mobile devices for security surveillance, as well as to analyze image and video content for surveillance purposes. While the prior art discloses individual aspects as the present invention, very few, if any, teach the ability to authenticate and analyze captured inputs from un-registered user-devices. The present invention permits remote servers to accept captured inputs from a variety of mobile devices, authenticate metadata from the inputs, and analyze the inputs to provide surveillance information.

The proliferation of wireless, mobile devices having image and video functions is widespread and use of these device-functions continues to increase. Sporting events, social gatherings, dissident events, and emergency situations are typically captured on a multitude of devices operated by differing users. Nowhere in the prior art is provided social surveillance or security system that allows for uploading of these captured inputs, authentication of such inputs, and cloud-based analysis of the inputs in order to provide real- or near real-time surveillance of a target environment. Prior art documents teach that camera and video input devices may be equipped with a time-stamp function that embeds a date and time into an image or video for later authentication. Also, it is known in the prior art to provide authentication of users and/or devices through the evaluation of uploaded content, including stenographic techniques such as digital fingerprinting and watermarking, or user-verification techniques such as login or CAPTCHA technologies and biometric scanning.

Notably, most of the prior art security surveillance systems disclose the use of fixed devices, rather than the use of mobile devices. For example, content-based analytics is widely used in CCTV settings and when verifying that digital content has been unaltered or authenticating a content's source (e.g., copyrighted music, images and videos). Additionally, similar technology has been deployed in military and law enforcement units, although these technologies typically require specialized pre-registered devices, as opposed to incorporating distributed, unknown devices.

By way of example, prior art documents include:

U.S. Pat. No. 8,559,914 for "Interactive personal surveillance and security (IPSS) system" by inventor Jones filed Jan. 16, 2009, describes an interactive personal surveillance and security (IPSS) system for users carrying wireless communication devices. The system allows users carrying these devices to automatically capture surveillance information, have the information sent to one or more automated and remotely located surveillance (RLS) systems, and establish interactivity for the verification of determining secure or dangerous environments, encounters, logging events, or other encounters or observations. This IPSS is describes to enhance security and surveillance by determining a user's activities, including (a.) the user travel method (car, bus, motorcycle, bike, snow skiing, skate boarding, etc.); (b.) the user motion (walking, running, climbing, falling, standing, lying down, etc.); and (c.) the user location and the time of day or time allowance of an activity. When user submits uploaded (or directly sent) surveillance information to the public server, the surveillance videos, images and/or audio includes at least one or more of these searchable areas, location, address, date and time, event name or category, and/or name describing video.

U.S. Pat. No. 8,311,983 for "Correlated media for distributed sources" by inventor Guzik filed Dec. 14, 2009 (related to U.S. Publications 2010/0274816, 2011/0018998, 2013/0027552 and 2013/0039542) discloses method embodiments associating an identifier along with correlating metadata such as date/timestamp and location. The identifier may then be used to associate data assets that are related to a particular incident. The identifier may be used as a group identifier on a web service or equivalent to promote sharing of related data assets. Additional metadata may be provided along with commentary and annotations. The data assets may be further edited and post processed. Correlation can be based on multiple metadata values. For example, multiple still photos might be stored not only with date/time stamp metadata, but also with location metadata, possibly from a global positioning satellite (GPS) stamp. A software tool that collects all stored still photos taken within a window of time, for example during a security or police response to a crime incident, and close to the scene of a crime, may combine the photos of the incident into a sequence of pictures with which for investigation purposes. Here the correlation is both by time and location, and the presentation is a non-composite simultaneous display of different data assets. Correlating metadata can be based on a set of custom fields. For example, a set of video clips may be tagged with an incident name. Consider three field police officers each in a different city and in a different time zone, recording videos and taking pictures at exactly at midnight on New Year's Day 2013. As a default, a group may be identified to include all users with data files with the same Event ID. A group may also be either a predefined or a self-selecting group, for example a set belonging to a security agency, or a set of all police officers belonging to the homicide division, or even a set of officers seeking to share data regardless of if they are bellowing to an organized or unorganized group.

U.S. Pat. No. 7,379,879 for "Incident reporting system and method" by inventor Sloo filed Feb. 26, 1999, describes a computer-based method of collecting and processing incident reports received from witnesses who observe incidents such as criminal acts and legal violations. The method automates the collection and processing of the incident reports and automatically sends the incident reports to the appropriate authority so that the observed incidents can be acted on in an appropriate manner. For example, a witness may be equipped with a video input system such as a personal surveillance, camera and a display. When the witness encounters an incident such as a suspect committing a crime, the video input system would automatically recognize the suspect from the video input and could then display records for the suspect on the witness's hand held readout without revealing the suspect's identity. The witness would not need to know the identity of the suspect to observe the incident relating to the suspect. Such a system may overcome some of the problems associated with publicly revealing personal data.

U.S. Publication 2009/0087161 for "Synthesizing a presentation of a multimedia event" by inventors Roberts, et al. filed Sep. 26, 2008, discloses a media synchronization system includes a media ingestion module to access a plurality of media clips received from a plurality of client devices, a media analysis module to determine a temporal relation between a first media clip from the plurality of media clips and a second media clip from the plurality of media clips, and a content creation module to align the first media clip and the second media clip based on the temporal relation, and to combine the first media clip and the second media clip to generate the presentation. Each user who submits content may be assigned an identity (ID). Users may upload their movie clips to an ID assignment server, attaching metadata to the clips as they upload them, or later as desired. This metadata may, for example, include the following: Event Name, Subject, Location, Date, Timestamp, Camera ID, and Settings. In some example embodiments, additional processing may be applied as well (e.g., by the recognition server and/or the content analysis sub-module). Examples of such additional processing may include, but are not limited to, the following: Face, instrument, or other image or sound recognition; Image analysis for bulk features like brightness, contrast, color histogram, motion level, edge level, sharpness, etc.; Measurement of (and possible compensation for) camera motion and shake.

U.S. Publication 2012/0282884 for "System and method for the emergency voice and image e-mail transmitter device" by inventor Sun filed May 5, 2011, describes a voice and image e-mail transmitter device with an external camera attachment that is designed for emergency and surveillance purposes is disclosed. The device converts voice signals and photo images into digital format, which are transmitted to the nearest voice-image message receiving station from where the digital signal strings are parsed and converted into voice, image, or video message files which are attached to an e-mail and delivered to user pre-defined destination e-mail addresses and a 911 rescue team. The e-mail also includes the caller's voice and personal information, photo images of a security threat, device serial number, and a GPS location map of the caller's location. When the PSU device is initially used, the user needs to pre-register personal information and whenever a digital signal string is transmitted out from the PSU device it will include these personal information data plus a time code of the message being sent, the PSU device's unique serial number, and the GPS generated location code, etc. which will all be imbedded in the PSU e-mail.

U.S. Publication 2012/0262576 for "Method and system for a network of multiple live video sources" by inventors Sechrist, et al. filed Mar. 15, 2012, discloses a system and a method that operate a network of multiple live video sources. In one embodiment, the system includes (i) a device server for communicating with one or more of the video sources each providing a video stream; (ii) an application server to allow controlled access of the network by qualified web clients; and (iii) a streaming server which, under direction of the application server, routes the video streams from the one or more video sources to the qualified web clients.

Geo-location information and contemporaneous timestamps may be embedded in the video stream together with a signature of the encoder, providing a mechanism for self-authentication of the video stream. A signature that is difficult to falsify (e.g., digitally signed using an identification code embedded in the hardware of the encoder) provides assurance of the trustworthiness of the geo-location information and timestamps, thereby establishing reliable time and space records for the recorded events. In general, data included in the database may be roughly classified into three categories: (i) automatically collected data; (ii) curated data; and (iii) derivative data. Automatically collected data includes, for example, such data as reading from environmental sensors and system operating parameters, which are collected as a matter of course automatically. Curated data are data that are collected from examination of the automatically collected data or from other sources and include, for example, content-based categorization of the video streams. For example, detection of a significant amount of motion at speeds typical of automobiles may suggest that the content is "traffic," Derivative data includes any data resulting from analysis of the automatically collected data, the curated data, or any combination of such data. For example, the database may maintain a ranking of video source based on viewership or a surge in viewership over recent time period. Derivative data may be generated automatically or upon demand.

None of the prior art provides solutions for cloud-based analytics of distributed input devices for secure social surveillance as provided by the present invention.

SUMMARY

The present invention relates to virtualized computing or cloud-computing network with distributed input devices and at least one remote server computer for automatically analyzing received video, audio and/or image inputs for providing social security and/or surveillance for a surveillance environment, surveillance event, and/or surveillance target.

The present invention is directed to a social surveillance system and methods for providing automated cloud-based analytics that allows for uploading of captured inputs, authentication of the inputs, and analysis of the inputs to provide real- or near real-time surveillance of a surveillance environment, surveillance event, and/or surveillance target. The social surveillance invention includes a combination of several key features including input authentication, time, and automated cloud-based analytics relating to the inputs and the surveillance environment, surveillance event, and/or surveillance target. The authentication is provided with device and/or user with location wherein the input devices provide information including geographic location information and/or global positioning system (GPS) information to be embedded within images and videos and/or included in the messaging from the input devices over the network to the at least one server computer. The input devices include mobile input capture devices including but not limited to smart phones, tablet computers, mobile communications devices, portable computers, wearable computers and/or wearable input capture and communication devices.

These and other aspects of the present invention will become apparent to those skilled in the art after a reading of the following description of the preferred embodiment when considered with the drawings, as they support the claimed invention.

DETAILED DESCRIPTION

Figure 1:
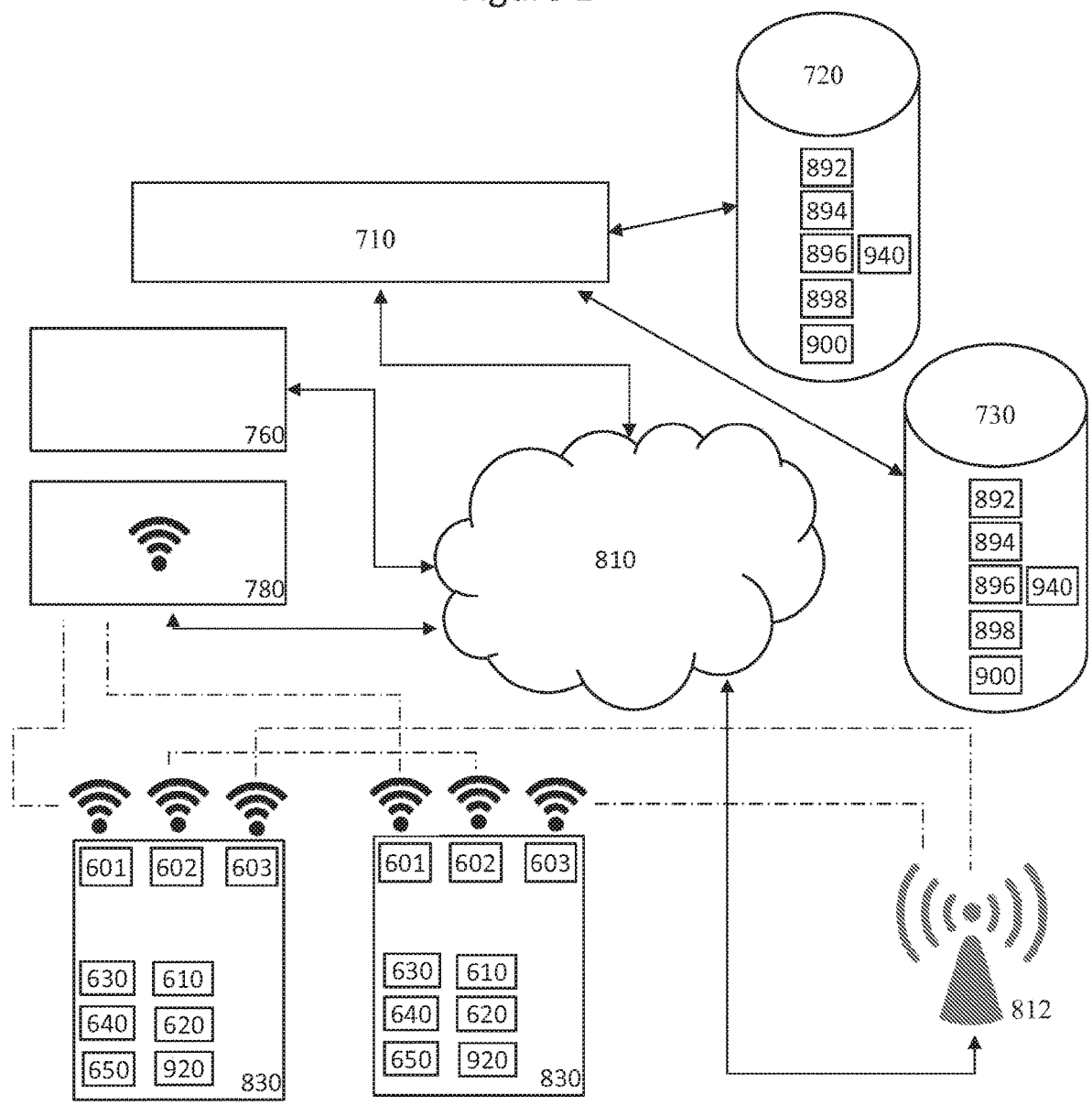
FIG. 1 is a schematic diagram of one embodiment of the invention.

Referring now to the drawings in general, the illustrations are for the purpose of describing a preferred embodiment of the invention and are not intended to limit the invention thereto.

The present invention relates to cloud-based surveillance systems and methods for providing at least one server computer in communication with a network for providing centralized and/or distributed cloud-based analytics of inputs captured from remote input capture devices for providing analyzed inputs that are stored in the cloud-based system database and accessible remotely and securely for providing security for at least one surveillance environment, surveillance event, and/or surveillance target. Related secure wired and/or wireless networks and systems, and methods for using them are disclosed in U.S. Publications 2006/0064477 and 2014/0071289; U.S. application Ser. No. 14/249,687; and U.S. Pat. Nos. 7,784,080, 7,719,567, 7,954,129, 7,728,871, 7,730,534 and 8,395,664, each of which are incorporated herein by reference in their entirety.

The present invention provides a cloud-computing surveillance system including: at least one server computer having a processor and a memory, constructed and configured in network-based communication with a multiplicity of remote input devices having input capture mechanisms; inputs captured by the remote input devices transmitted within a secure messaging communicated over the network; wherein the inputs are received, authenticated, and indexed by the at least one server computer and stored in a corresponding database; wherein the inputs are processed and analyzed based upon at least one profile for a surveillance environment, a surveillance event, and/or a surveillance target, for providing a near-real-time analysis of the inputs to determine a status of security. The at least one profile associated with the surveillance environment, surveillance event, and/or surveillance target may include security level (low, medium, high), alert level, time interval for review for change, authorized remote input device and/or user information, and combinations thereof. The status may be selected from: normal, questionable, alert, urgent, disaster, injury, and any descriptor or indicator of the level and condition of the environment, event, and/or target compared with predetermined conditions.

The system may further include a priority and a profile associated with the inputs for automatically associating the inputs with the corresponding surveillance environment, surveillance event, and/or surveillance target. The profile associated with the inputs may include user and/or owner identifier, equipment identifier, communication security level, and combinations thereof. In one embodiment, the secure messaging includes internet protocol (IP) messaging of data packet(s) including the inputs, and may further include encryption, digital fingerprinting, watermarking, media hashes, and combinations thereof. As described in the following detailed description of the invention, the inputs are selected from images, audio, and/or video; more particularly, the input is selected from live streaming video, real-time images and/or audio, previously recorded video, previously captured images and/or audio, and combinations thereof. The remote input devices include mobile phones, smart phones, tablet computers, portable computers, mobile communication devices, wearable input capture devices, and/or security cameras. By way of example and not limitation, a wearable input capture device may be removable, portable devices such as eyewear (like Google Glass), headwear, wristwear, etc.

The analysis is performed by a virtualized or cloud-based computing system and provides for remote access of analyzed inputs, and involves at least one rules engine for transforming individual inputs into analyzed content. The analyzed content may include inputs from more than one remote input device. Additionally, the analyzed content may be generated by transforming the original inputs by the at least one server computer automatically assembling input fragments into an integrated content file, and wherein the original input is stored and associated with the integrated content file.

In one embodiment of the present invention, the authentication includes confirmation of global positioning system (GPS) location of each of the remote input devices providing inputs and matching the GPS location with corresponding at least one predetermined surveillance environment, surveillance event, and/or surveillance target, Preferably, the analysis includes authentication of the input device with a device identification, a user identification, a geographic location, and a time associated with the input and the predetermined surveillance environment, surveillance event, and/or surveillance target.

At the at least one server computer, the authenticated inputs are automatically tagged, combined, grouped, edited, and analyzed by the cloud-based system according to the predetermined surveillance environment, surveillance event, and/or surveillance target. Also, the input is verified by authenticating the at least one input device and/or its corresponding user and the input is analyzed to confirm that there has been no alteration, editing, and/or modification to the input prior to its receipt by the at least one server computer.

The present invention also provides methods for the system described in the foregoing, including the steps of: providing a cloud-based or virtualized computing system having at least one server computer with a processor and a memory, constructed and configured in network-based communication with a multiplicity of remote input devices having input capture mechanisms; receiving by the at least one server computer inputs from the remote input devices transmitted within a secure messaging communicated over the network; authenticating the inputs; indexing the inputs by the at least one server computer; and storing the inputs in a corresponding database; processing and analyzing the inputs by the at least one server computer using at least one profile for a surveillance environment, a surveillance event, and/or a surveillance target, for providing a near-real-time analysis of the inputs to determine a status of security. Additional steps may include: providing a priority for the secure messaging; analyzing inputs from more than one remote input device in near real time to provide social security surveillance of the surveillance environment, surveillance event, and/or surveillance target; and/or automatically assembling input fragments into an integrated content file, and wherein the original input is stored and associated with the integrated content file. Also, preferably, the authenticating step includes automatic authentication of the input device and/or its user based upon the combination of a device identification, a user identification, a geographic location, and a time associated with the input and the predetermined surveillance environment, surveillance event, and/or surveillance target.

The present invention systems and methods include a social surveillance system for providing automated cloud-based analytics that allows for uploading of captured inputs, authentication of the inputs, and analysis of the inputs to provide real- or near real-time surveillance of a surveillance environment, surveillance event, and/or surveillance target. The social surveillance invention includes a combination of several key features including input authentication, time, and automated cloud-based analytics relating to the inputs and the surveillance environment, surveillance event, and/or surveillance target.

The authentication is provided with device and/or user with location wherein the input devices provide information including geographic location information and/or global positioning system (GPS) information to be embedded within images and videos and/or included in the messaging from the input devices over the network to the at least one server computer. Additionally, overlay and other techniques may also be used during upload of content, such as, by way of example and not limitation, TDOA, AIA, and RF fingerprinting technologies.

Preferably, the input devices are equipped with a time-stamp function that embeds a date and time into an image or video for later authentication, or their messaging provides a date and time associated with the inputs, including images, and/or video.

Additionally, the authentication of users and/or devices through the evaluation of uploaded content, including stenographic techniques such as digital fingerprinting and water-marking, or user-verification techniques such as login or CAPTCHA technologies and biometric scanning.

While some content is considered verified by authenticating a user or device, additional analytics may be performed by the cloud-based system to establish that content has not been modified from its original sources, such as through the use of media hashes. Additionally, after receiving and authenticating multiple sources of information, analytics may allow for the inputs to be aggregated, tagged, combined, edited, and/or grouped. Although in the prior art, content-based analytics is used in CCTV settings and when verifying that digital content has been unaltered or authenticating a content's source (e.g., copyrighted music, images and videos), it has not been used for distributed, cloud-based social surveillance allowing for a multiplicity of inputs from remote input devices to at least one server computer for analysis of the inputs based upon a predetermined surveillance environment, surveillance event, and/or surveillance target, and more particularly for security surveillance.

Notably, the present invention does not require specialized pre-registered devices, but instead incorporates distributed, and potentially unknown devices, so long as the user, time and location correspond to the predetermined surveillance environment, surveillance event, and/or surveillance target.

Systems and methods of the present invention provide for a multiplicity of remote input devices, by way of example and not limitation, including commercially available devices such as Google glass or glasses or headwear having input capture mechanisms and mobile communication capability, mobile smart phones, cellular phones, tablet computers, gaming devices such as an Xbox Kinect controller, so long as the input device is constructed and configured to capture and share or transmit video and/or images associated with location data, direction, etc. and owners/users with the cloud-based surveillance system. The input information is stored on at least one server computer, in a centralized and/or virtualized central manner, and the input information is indexed, organized, stored, and available for access by authorized users via the network through a website or portal or API. The input device is preferably registered with the system through an app or software application associated with the remote or distributed input devices. While preregistration is not required for the inputs to be associated with at least one surveillance environment, surveillance event, and/or surveillance target, all inputs are required to be authenticated by the system based upon the input device, the input device user, and/or corresponding identification and/or association with the surveillance environment, surveillance event, and/or surveillance target. By way of example and not limitation, a video input is transmitted by a remote input device with an email including the video input as a media attachment within the message; the cloud-based system and its at least one server computer receives the email message, authenticates the email address associated with the device and/or user, and accepts the video. Also the same is provided with MMS or text messaging with video and/or audio and/or image.

In one embodiment of the present invention, method steps include: providing the system as described hereinabove; providing a software application operating on a remote input device for capturing at least one input including an image, a video, and/or an audio input; activating the software application; capturing the at least one input including an image, a video, and/or an audio input; automatically and/or manually including structural and/or descriptive metadata, including but not limited to unique identifying indicia associated with the input, time, location or geographic information, text and/or audio notation associated with the input, priority flag or indicator, and combinations thereof.

Optionally, the software application and/or the remote input device automatically verifies and authenticates the user of the remote input device, for example using biometric authentication such as facial recognition, fingerprint, etc., and/or using a user identification and passcode or personal identification number, or other authentication mechanisms. Preferably, the authentication information is included with the metadata corresponding to the input(s) and associated therewith as a composite input, and the software application and/or the remote input device automatically transmits the composite input over the network to the cloud-based system and the at least one server computer thereon and is saved in at least one database. In preferred embodiments of the present invention, a user interface is provided on the remote input device(s) or distributed computer device(s) and their corresponding displays to provide secure, authorized access to the composite input and/or to all inputs associated with predetermined surveillance environment, surveillance event, and/or surveillance target stored in the cloud database.

Also, preferably, the software application on the remote input device provides an automated sharing feature that provides for single click select and activation of media sharing of the selected inputs captured. In one embodiment, the single click select and activation of media sharing of the selected inputs captured on that remote input device provides for automatic association of the shared media with at least one email address corresponding to the user and the remote input device.

Figure 2:
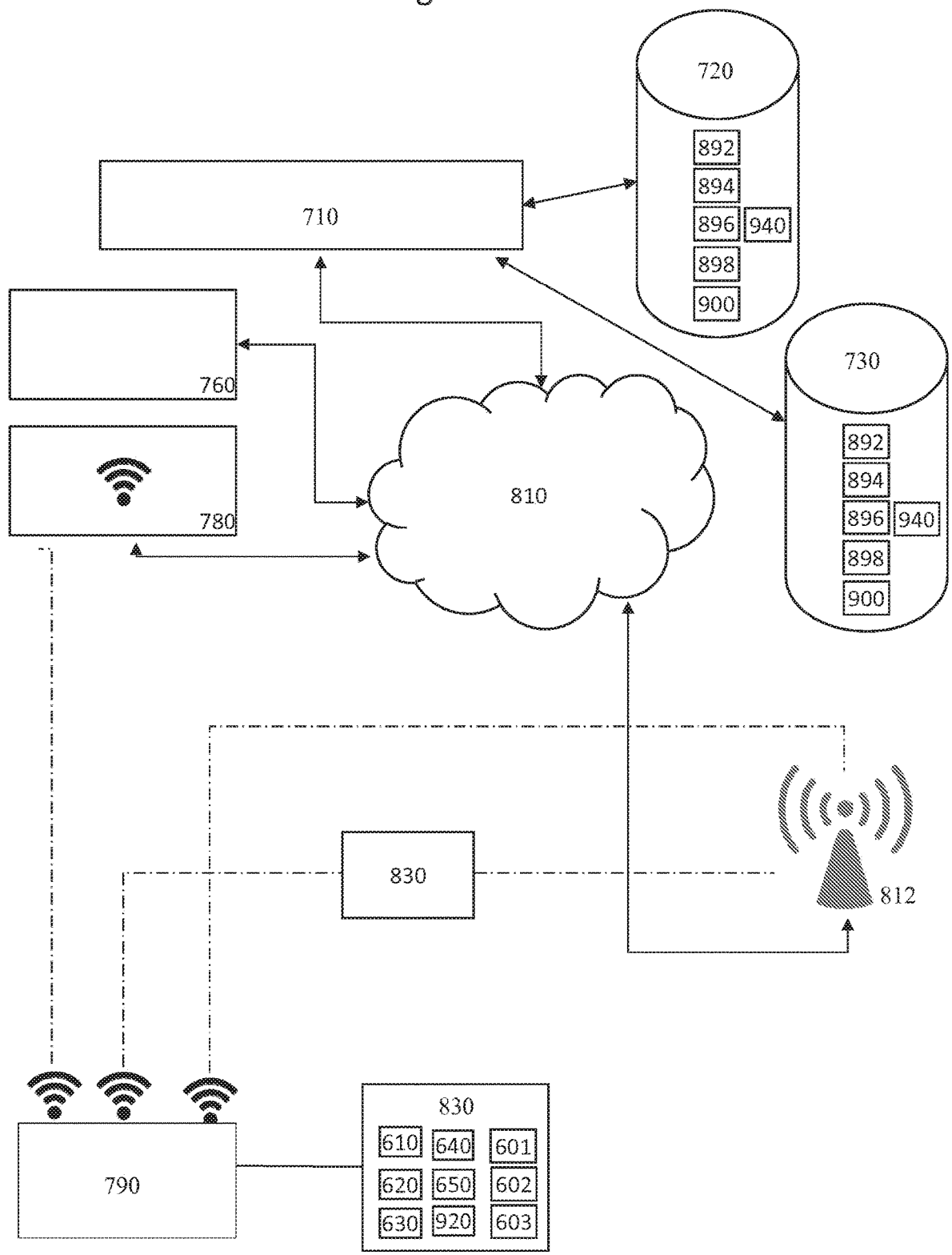
FIG. 2 is a schematic diagram of one embodiment of the invention.
Figure 3:
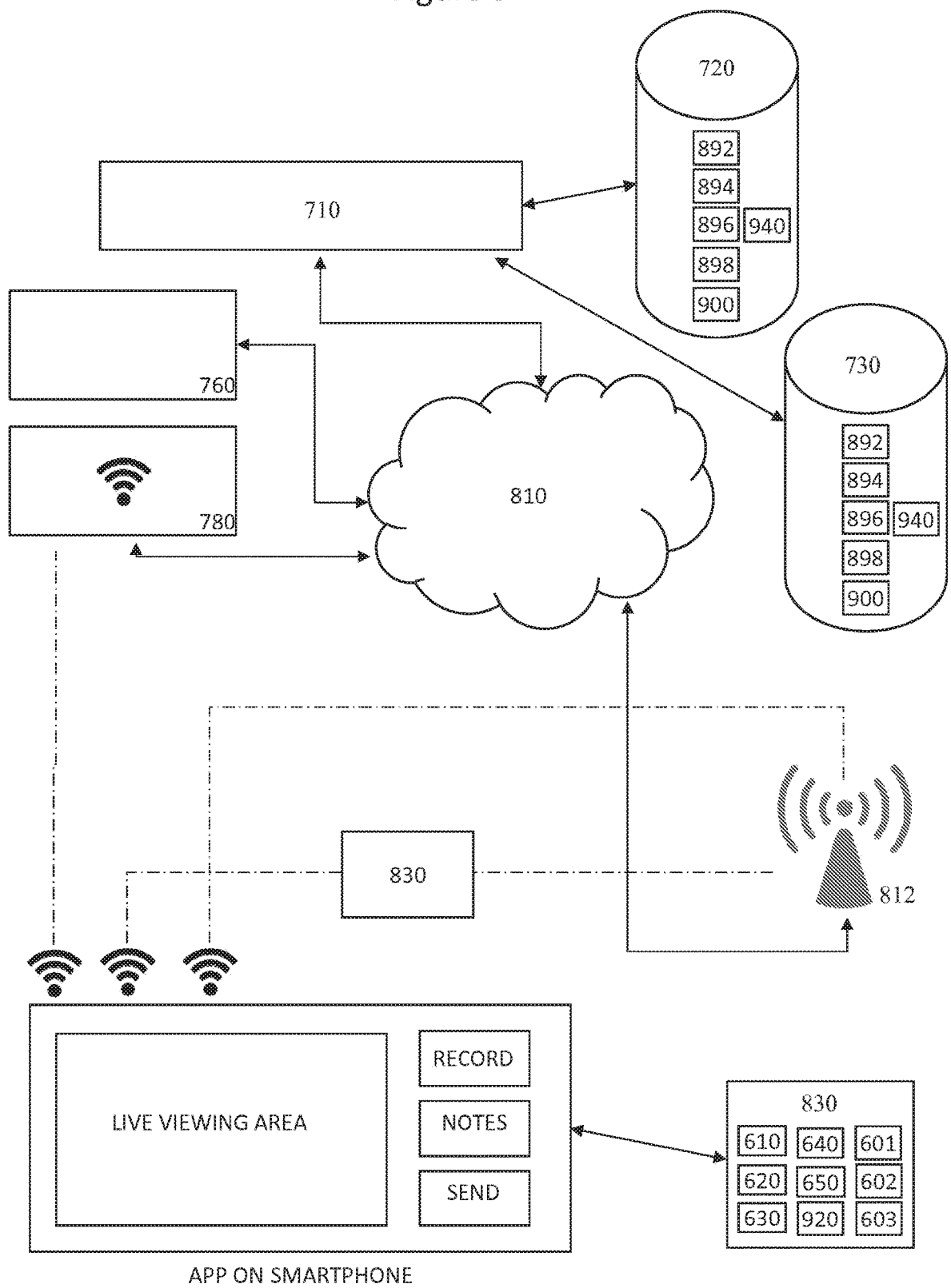
FIG. 3 is a schematic diagram of one embodiment of the invention.

FIGS. 1-3 illustrate schematic diagrams of the present invention; like reference indicators are used throughout the multiple figures for the same or similar elements, as appropriate. FIG. 1 shows a CPU processor and/or server computer 710 in network-based communication with at least one database 720 and at least one geographically redundant database 730, a communications (wired and/or wireless) router 780, communications tower 812 and distributed input capture devices 830. The distributed input capture devices may include image capture 610, video capture 620, audio capture 630, text and audio note 640, and/or geo-location 650 technologies, each technology capable of collecting data for upload to the network 810 and storage on the databases 720, 730. As the distributed input capture devices 830 may also contain identity technologies 920, such as facial, fingerprint and/or retina recognition, both databases 220, 240 may include identity database 940 for validating fingerprints, facial recognition, and/or retina recognition. Distributed input capture devices 830 may communicate with the each other through Bluetooth wireless 602, with the communications tower 812 through cellular wireless 603, and/or with a router 780 through Wi-Fi wireless 601. Device 760, being any computer, tablet, smartphone, or similar device, permits user access to the data, video, image, and audio storage on the cloud.

FIG. 2 illustrates another embodiment of a cloud-based analytics system providing for the components shown, including wearable input capture devices 790 associated with input capture devices 830.

FIG. 3 illustrates another cloud-based or virtual computing system with the components shown, including a software application or app on a smartphone having a graphic user interface (GUI) providing for a live viewing area on the device and function buttons, virtual buttons (i.e., touch-activated, near-touch-activated, etc.) of record, notes, and send, associated with input capture devices 830.

Although 'cloud computing' can generically be applied to any software as a service or to services interfacing through the Internet, in the present invention, 'cloud-based' computing refers to distributed computing among at least one server or more than one server.

Figure 4:
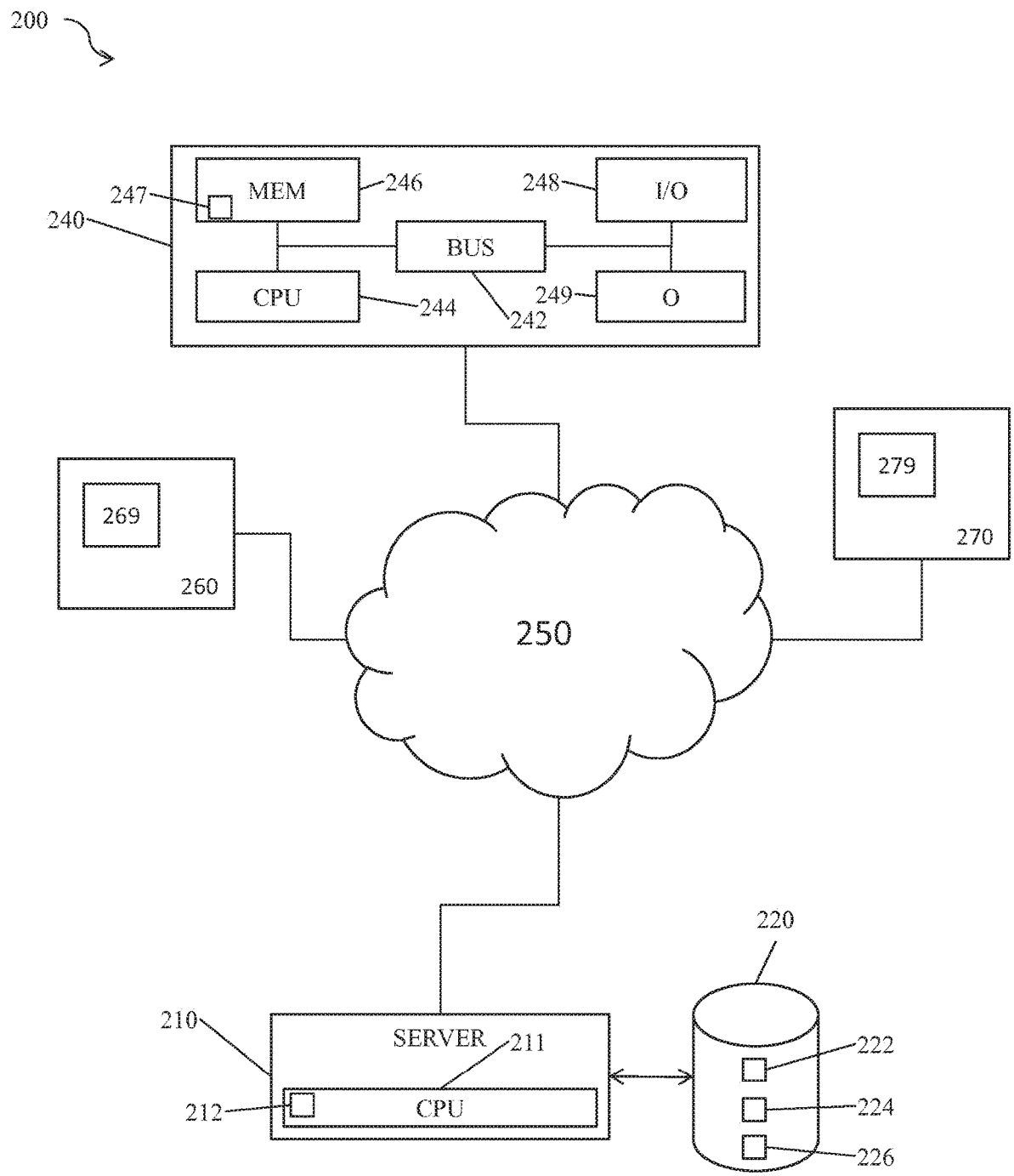
FIG. 4 is a schematic diagram of a cloud-based system of the present invention.

Referring now to FIG. 4, a schematic diagram illustrating a virtualized computing network used in of one embodiment of the invention for automated systems and methods is shown. As illustrated, components of the systems and methods include the following components and sub-components, all constructed and configured for network-based communication, and further including data processing and storage. As illustrated in FIG. 4, a basic schematic of some of the key components of a financial settlement system according to the present invention are shown. The system 200 comprises a server 210 with a processing unit 211. The server 210 is constructed, configured and coupled to enable communication over a network 250. The server provides for user interconnection with the server over the network using a personal computer (PC) 240 positioned remotely from the server, the personal computer having instructions 247. Furthermore, the system is operable for a multiplicity of remote personal computers or terminals 260, 270, having operating systems 269, 279. For example, a client/server architecture is shown. Alternatively, a user may interconnect through the network 250 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices. The operating system may be any operating system known in the art that is suitable for network communication as described hereinbelow. Data storage 220 may house an operating system 222, memory 224, and programs 226.

Figure 5:
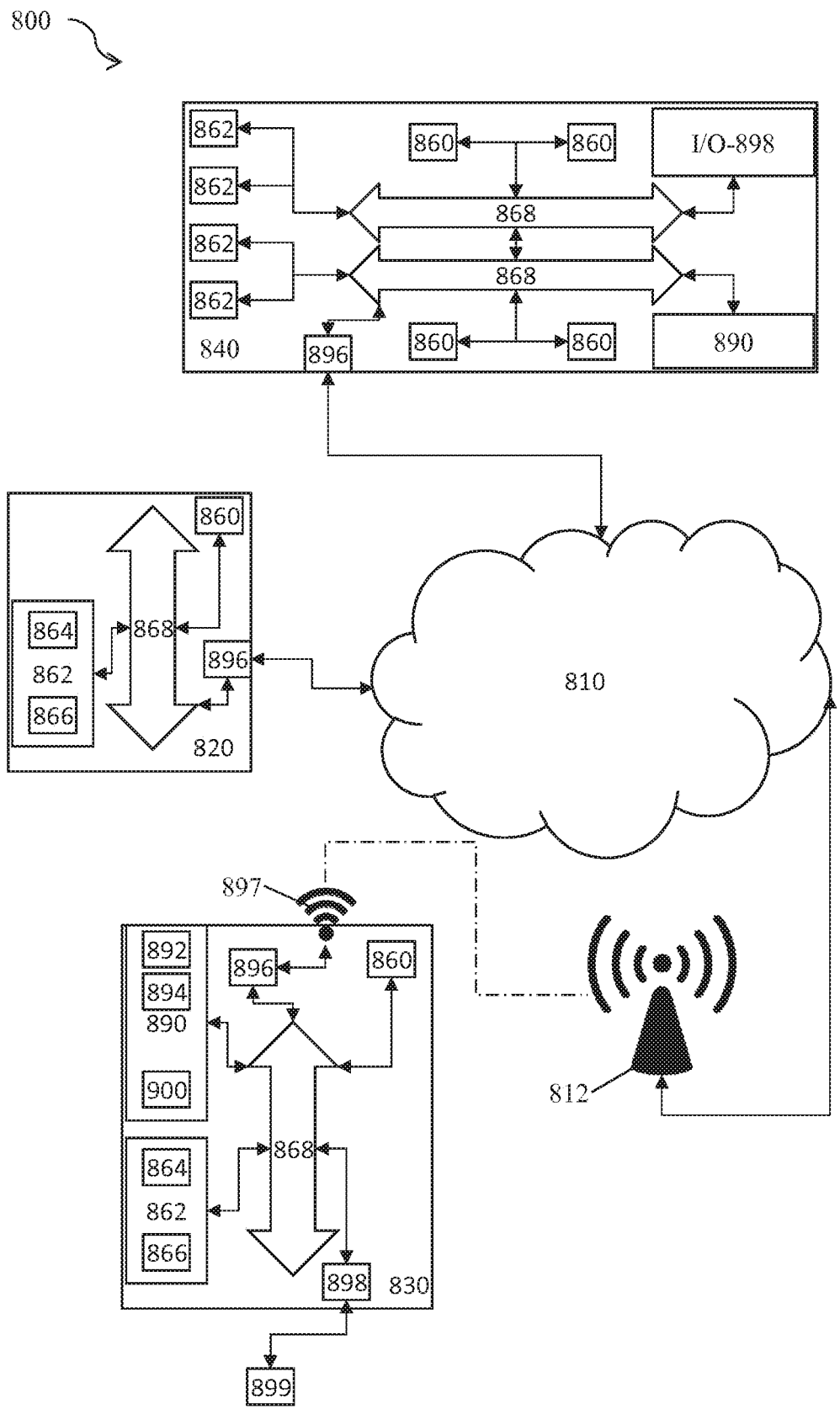
FIG. 5 is another schematic diagram of a cloud-based system of the present invention.

Additionally or alternatively to FIG. 4, FIG. 5 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 5, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 5, may include other components that are not explicitly shown in FIG. 5, or may utilize an architecture completely different than that shown in FIG. 5. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. By way of example and not limitation, the present invention systems and methods may further include automated web-based searching to identify and analyze similar images and/or videos (or content, individuals, objects, and combinations thereof in the images and/or videos) from social websites or social media postings to associate, link, supplement and/or match with the at least one input authenticated and received by the cloud-based server(s) and corresponding to a surveillance environment, a surveillance event, and/or a surveillance target within a predetermined timeframe. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A social surveillance system comprising:
    at least one server computer configured for network-based communications with unregistered mobile input capture devices that are not registered with the social surveillance system, wherein the at least one server computer includes:
        one or more processors; and
        memory storing instructions, wherein the instructions are executable by the one or more processors to cause the social surveillance system to:
            identify that the unregistered mobile input capture devices are located at a predetermined surveillance zone,
            receive, via a network, inputs captured by the unregistered mobile input capture devices,
            authenticate the inputs, and
            determine whether or not a status of social security at the predetermined surveillance zone is normal based on:
                the inputs received from the unregistered mobile input capture devices and authenticated, and
                at least one predetermined surveillance profile indicating at least a security level for the predetermined surveillance zone.

2. The social surveillance system of claim 1, wherein the instructions are executable by the one or more processors to further cause the social surveillance system to tag, combine, group, or analyze the inputs, wherein the inputs include images or video.

3. The social surveillance system of claim 1, wherein the predetermined surveillance zone is a predefined surveillance environment, a predefined surveillance event, or a predefined surveillance target.

4. The social surveillance system of claim 1, wherein the instructions are executable by the one or more processors to further cause the social surveillance system to authenticate the inputs based on whether the unregistered mobile input capture devices are positioned to capture the inputs from the predetermined surveillance zone.

5. The social surveillance system of claim 1, wherein the instructions are executable by the one or more processors to further cause the social surveillance system to:
receive positional information for the unregistered mobile input capture devices; and
analyze the positional information to authenticate the inputs received from the unregistered mobile input capture devices located at the predetermined surveillance zone.

6. The social surveillance system of claim 1, wherein, in order to authenticate the inputs, the instructions are executable by the one or more processors to cause the social surveillance system to:
receive location information for each of the unregistered mobile input capture devices providing the inputs; and
identify the unregistered mobile input capture devices at a surveillance environment, a surveillance event, or a surveillance target.

7. The social surveillance system of claim 1, wherein the instructions are executable by the one or more processors to further cause the social surveillance system to authenticate the inputs based on one or more of a device identification, a user identification, a geographic location, or a time associated with each received input.

8. The social surveillance system of claim 1, wherein the instructions are executable by the one or more processors to further cause the social surveillance system to analyze the inputs to confirm that there has been no alteration, editing, or modification to the inputs prior to receipt by the at least one server computer from the unregistered mobile input capture devices.

9. A social surveillance method comprising:
receiving, by at least one server computer of a social surveillance system, via a wireless network, inputs from unregistered mobile input capture devices that are not registered with the social surveillance system;
identifying that the unregistered mobile input capture devices are located at a predetermined surveillance zone;
authenticating the inputs from the identified unregistered mobile input capture devices; and
determining whether or not a status of social security at the predetermined surveillance zone is normal based on:
(a) the inputs received from the unregistered mobile input capture devices and authenticated, and
(b) at least one predetermined surveillance profile indicating at least a security level for the predetermined surveillance zone.

10. The social surveillance method of claim 9, wherein determining whether or not the status of social security at the predetermined surveillance zone is normal includes analyzing the inputs in near-real-time.

11. The social surveillance method of claim 9, wherein authenticating the inputs includes automatically authenticating one or more of the unregistered mobile input capture devices or users associated with the unregistered mobile input capture devices.

12. The social surveillance method of claim 9, further comprising automatically associating the inputs with at least one surveillance environment, surveillance event, or surveillance target.

13. The social surveillance method of claim 9, further comprising transmitting an indication of the status of social security at the predetermined surveillance zone to at least one remote computing device.

14. The social surveillance method of claim 9, further comprising analyzing the inputs to confirm that there has been no alteration, editing, or modification to the inputs prior to receipt by the at least one server computer from the unregistered mobile input capture devices.

15. A social surveillance method comprising:
capturing one or more inputs via an unregistered mobile computing device, wherein the one or more inputs are associated with at least one surveillance zone; and
transmitting, from the unregistered mobile computing device, the one or more inputs to a remote server programmed to:
identify that the unregistered mobile computing device is located at the at least one surveillance zone;
authenticate the one or more inputs in which time and location of the unregistered mobile computing device correspond to the at least one surveillance zone, and
determine whether or not a status of social security at the at least one surveillance zone is normal based on:
the one or more inputs received from the unregistered mobile computing device and authenticated, and
at least one surveillance profile indicating at least a security level for the at least one surveillance zone.

16. The social surveillance method of claim 15, wherein the remote server is further programmed to analyze the one or more inputs to confirm that there has been no alteration, editing, or modification to the one or more inputs prior to receipt by the remote server from the unregistered mobile computing device.

* * * * *

UNITED STATES PATENT AND TRADEMARK OFFICE
CERTIFICATE OF CORRECTION

PATENT NO. : 11,128,838 B2  
APPLICATION NO. : 16/783071  
DATED : September 21, 2021  
INVENTOR(S) : Martin A. Renkis Page 1 of 1

It is certified that error appears in the above-identified patent and that said Letters Patent is hereby corrected as shown below:

On the Title Page

Column 1, item (71), The Applicant reads:
"Sensormatic Electronics, LLC, Westford, MA (US)"
Should read:
--Sensormatic Electronics, LLC, Boca Raton, FL (US)--

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*